(12) United States Patent
Mathiowetz

(10) Patent No.: US 6,675,906 B2
(45) Date of Patent: Jan. 13, 2004

(54) GROUND SURFACE TREATMENT APPARATUS

(76) Inventor: Reinhold P. Mathiowetz, 1204 Westwood Dr., Marshall, MN (US) 56258

( * ) Notice: Subject to any disclaimer, the term of this patent is extended or adjusted under 35 U.S.C. 154(b) by 181 days.

(21) Appl. No.: 09/896,598

(22) Filed: Jun. 29, 2001

(65) Prior Publication Data
US 2003/0000713 A1 Jan. 2, 2003

(51) Int. Cl.$^7$ .............................................. A01B 49/02
(52) U.S. Cl. ...................................................... 172/174
(58) Field of Search ........................ 172/40, 170–174, 172/484, 474, 464, 382, 265, 699, 133, 140, 249, 721, 725, 773; 404/122, 128–130

(56) References Cited

U.S. PATENT DOCUMENTS

| | | | |
|---|---|---|---|
| 3,897,830 A | 8/1975 | van der Lely | 172/68 |
| 3,993,413 A | 11/1976 | Cox et al. | 404/128 |
| 4,193,710 A | 3/1980 | Pietrowski | 404/128 |
| 4,252,376 A | 2/1981 | Gurries | 299/37 |
| 4,339,004 A | 7/1982 | van der Lely et al. | 172/537 |
| 4,378,052 A | 3/1983 | Anderson | 172/449 |
| 4,643,261 A | 2/1987 | Long | 172/2 |
| 4,679,635 A | 7/1987 | Fields | 172/260.5 |
| 4,726,428 A * | 2/1988 | Puntoni | 172/177 |
| 4,878,544 A | 11/1989 | Barnhart | 172/40 |
| 4,924,946 A * | 5/1990 | Dietrich, Sr. | 172/1 |
| 4,974,349 A | 12/1990 | Timmons | 37/103 |
| 5,409,068 A * | 4/1995 | Hake et al. | 172/139 |
| 5,524,711 A * | 6/1996 | Harris | 172/67 |
| 5,533,283 A | 7/1996 | Roth | 37/142.5 |
| 5,797,460 A * | 8/1998 | Parker et al. | 172/151 |
| 5,911,279 A * | 6/1999 | Whitener | 172/668 |
| 5,964,300 A * | 10/1999 | Wattonville et al. | 172/700 |
| 6,502,644 B2 * | 1/2003 | Steinlage et al. | 172/196 |

* cited by examiner

*Primary Examiner*—Robert E. Pezzuto
(74) *Attorney, Agent, or Firm*—Nawrocki, Rooney & Sivertson, P.A.

(57) ABSTRACT

A ground surface treatment apparatus including a frame adapted to be operatively received by a ground ripping attachment of a self propelled vehicle, and a ground engaging implement carried by the frame for treating the ground surface is provided. The apparatus further includes a resiliently responsive linkage interposed between a portion of the frame and a portion of the ground ripping attachment such that the frame is resiliently responsive to ground ripping tool manipulations and ground surface contours.

24 Claims, 9 Drawing Sheets

US 6,675,906 B2

GROUND SURFACE TREATMENT APPARATUS

TECHNICAL FIELD

The present invention generally relates to a ground surface treatment apparatus, more particularly to a ground surface treatment apparatus adapted for receipt on a ground ripping tool of a self propelled vehicle such as a road grader or the like.

BACKGROUND OF THE INVENTION

Numerous soil preparations and ground surface treatments are commonly required during a variety of earth moving operations, such as shoulder maintenance, construction site preparation, paving operations, utility installation, and landscaping, to name but a few. Almost always, the ground surface is modified, as by cutting, filling, scraping, ripping, etc., with quite a variety of machines and or implements available to perform the desired task. Inevitably, the re-contoured or modified ground surface requires some type of surface treatment, such as leveling, debris removal, compacting, etc., whether as a preliminary step in a multi-step ground surface finishing process (e.g., laying a road way), or as an end in itself (i.e., a finished condition).

Unlike the traditional farm tractor which may be equipped or outfitted with what seems to be an infinite number of attachments for completing whatever task a farmer may encounter, individual specialized pieces of equipment and dedicated skilled operators for each are necessary for the highly variable and many tasks encountered during earth moving operations. This greatly reduces the ability to "multi-task," at least in comparison to the tractor in an agricultural setting, thereby contributing significantly to overall project costs. Although there exists no known single machine capable of accomplishing the many required soil preparations and/or ground surface treatments, a great deal of combined functionality is known for, and available in, commercially available earth moving machines such as crawlers (i.e., a track propelled vehicle), excavators, motor graders, and wheeled tractors.

By way of illustration, broom attachments are known for motor graders (U.S. Pat. No. 4,643,261), as are ripping tools for both crawlers (U.S. Pat. No. 4,252,376) and motor graders (U.S. Pat. No. 5,795,096), and rollers for dump trucks (U.S. Pat. No. 4,193,710), crawlers (U.S. Pat. No. 4,878,544), and motor graders (U.S. Pat. No. 3,993,413), to name but a few. Furthermore, an equal number of hook-ups or linkages are known, and likely available, to secure individual implements, such as blades, scarifiers, rippers, loaders, or power booms, to their carrying vehicles, whether they be those previously noted, or otherwise, with particular emphasis on the efficiency of the mounting/removal procedures.

Although advances have been made so as to reduce the number of machines and/or operators on a job site, heretofore know machines are required to be selectively equipped with one of the many known implements, as by switching out one implement for another, which remains a time and labor intensive operation, typically requiring that such implements be transported to and from the job site, almost always by a vehicle separate from the carrying vehicle. Furthermore, a great many of the implements are unnecessarily cumbersome, having especially large and/or heavy frames for supporting the ground engaging tool either directly or indirectly, as is best exemplified in the case of road packers wherein spaced apart rows of pneumatic tires are supported by more than a single axle. Thus, there remains a need to efficiently offer a variety of ground surface treatments using a single machine, while minimizing the heretofore known burdens associated therewith.

SUMMARY OF THE INVENTION

A ground surface treatment apparatus including a frame adapted to be operatively received by a ground ripping attachment of a self propelled vehicle, and a ground engaging implement carried by the frame for treating the ground surface is provided. The apparatus further includes a resiliently responsive linkage interposed between a portion of the frame and a portion of the ground ripping attachment such that the frame is resiliently responsive to ground ripping tool manipulations and ground surface contours.

More specific features and advantages obtained in view of those features will become apparent with reference to the drawing figures and DETAILED DESCRIPTION OF THE INVENTION.

DETAILED DESCRIPTION OF THE INVENTION

Figure 1:
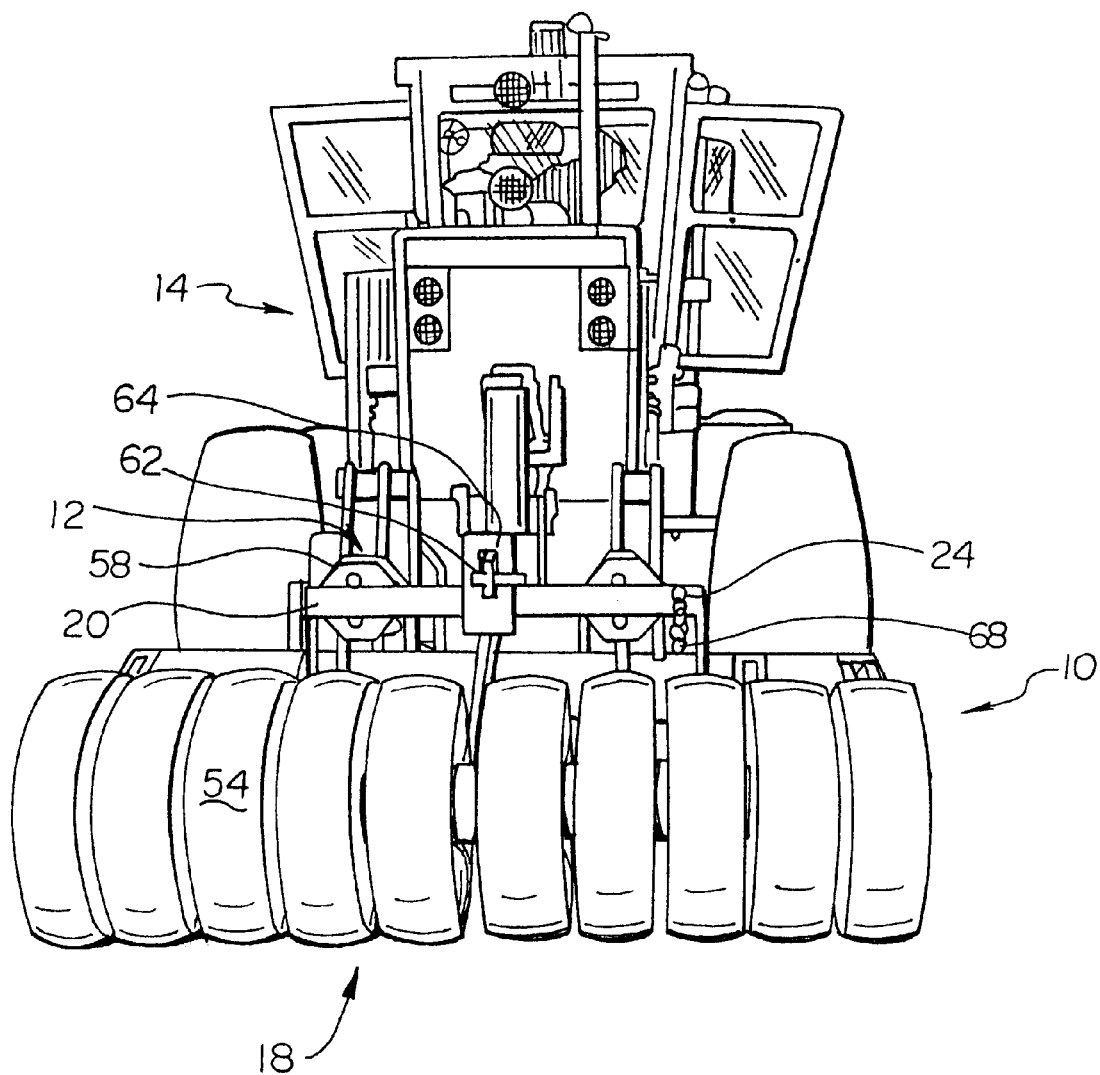
FIG. 1 is a rear view of the ground surface treatment apparatus of the subject invention shown operably joined to a ripping tool of a motor grader.
Figure 2:
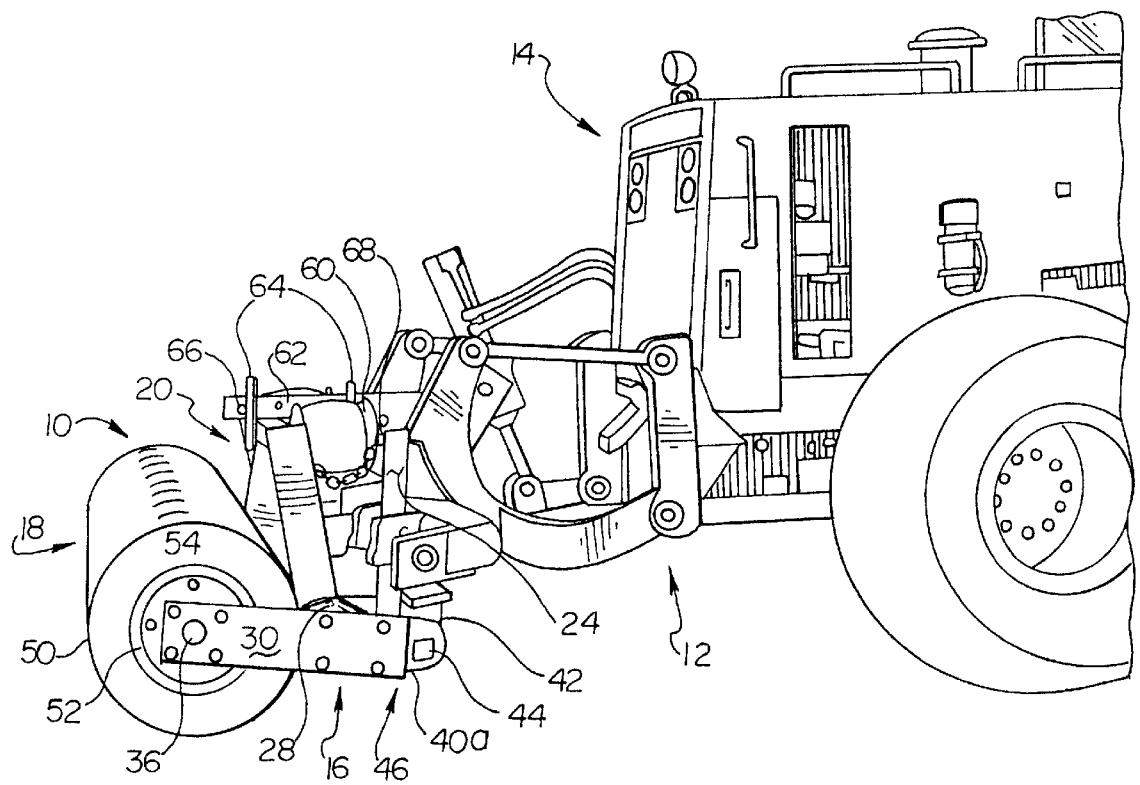
FIG. 2 is a side perspective view of the ground surface treatment apparatus of FIG. 1.

Referring generally to FIGS. 1–4, there is shown the ground surface treatment apparatus 10 of the subject invention operatively integrated with a ground ripping tool 12 which itself is shown operatively joined to a self propelled vehicle 14, for example, the motor grader as illustrated. The ground surface treatment apparatus 10 generally comprises a frame 16 adapted to be operatively received by the ground ripping attachment 12 of the self propelled vehicle 14, and a ground engaging implement 18 (e.g., a roller or rollers, compactor, etc.) carried by the frame 16 for treating the ground surface. A resiliently responsive linkage assembly 20 is interposed between a portion of the frame 16 and a portion of the ground ripping attachment 12 such that the frame 16 is resiliently responsive to ground ripping tool manipulations, and ground surface contours. The resiliently responsive linkage assembly 20 generally includes a bladder anchor structure 22, a bracket 24, and a resilient bladder 26 which joins the free ends of the anchor structure 22 and the bracket 24 as will later be detailed.

Figure 5:
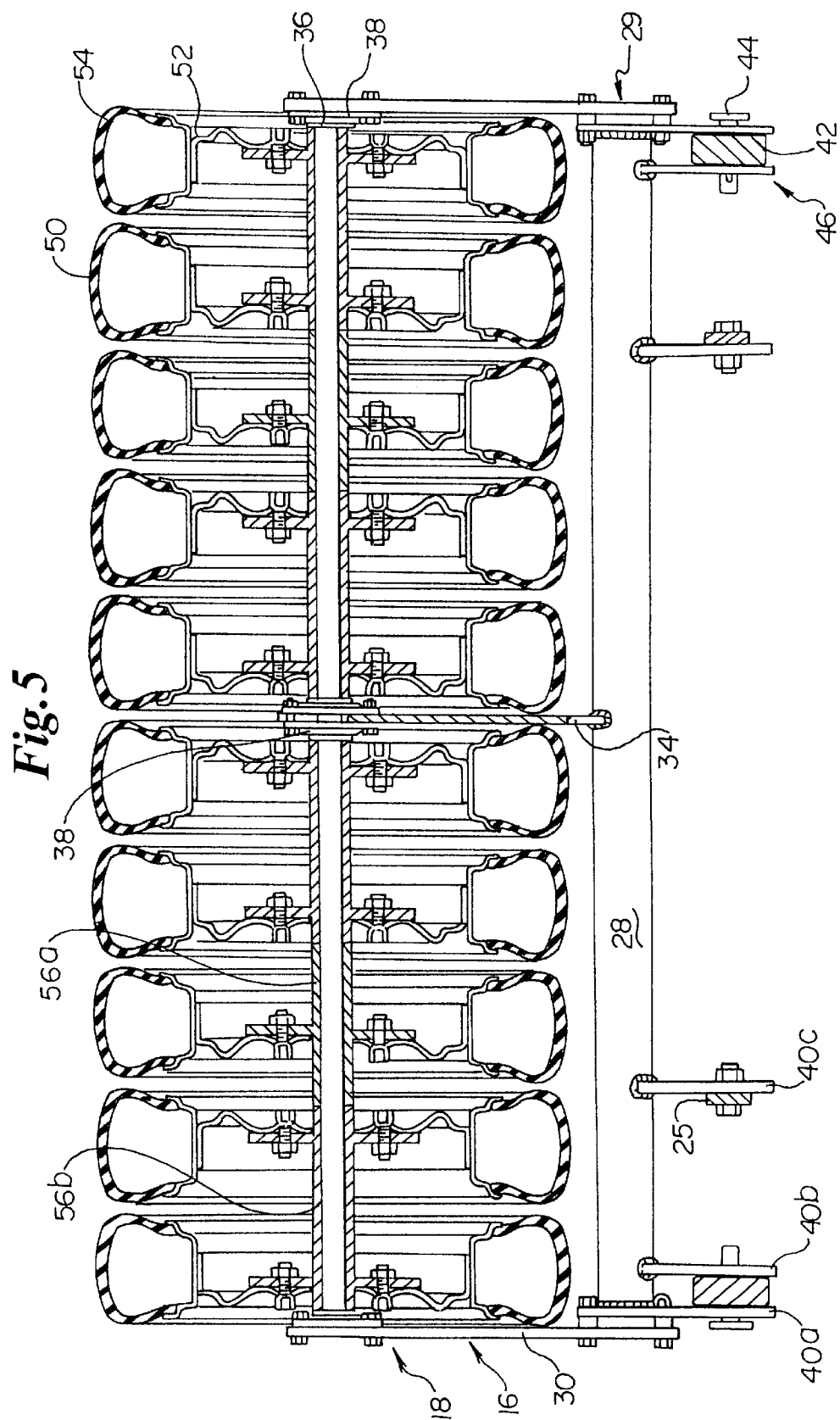
FIG. 5 is a sectional view along line 5—5 of FIG. 1.

With further reference to FIG. 5, the frame 16 of the ground surface treatment apparatus 10 generally includes a main beam 28 (i.e., structural member) which joins a pair of opposing arms 30. An axle 32, which is preferably but not necessarily adapted to carry a plurality of ground engaging rollers, as will subsequently be described, is operatively supported between the opposing arms 30 of the frame 16, more particularly, the opposing arms 30, along with an intermediate or center bracket 34, cooperatively engage an axle shaft 36 via axle mounting bearings 38.

Figure 7:
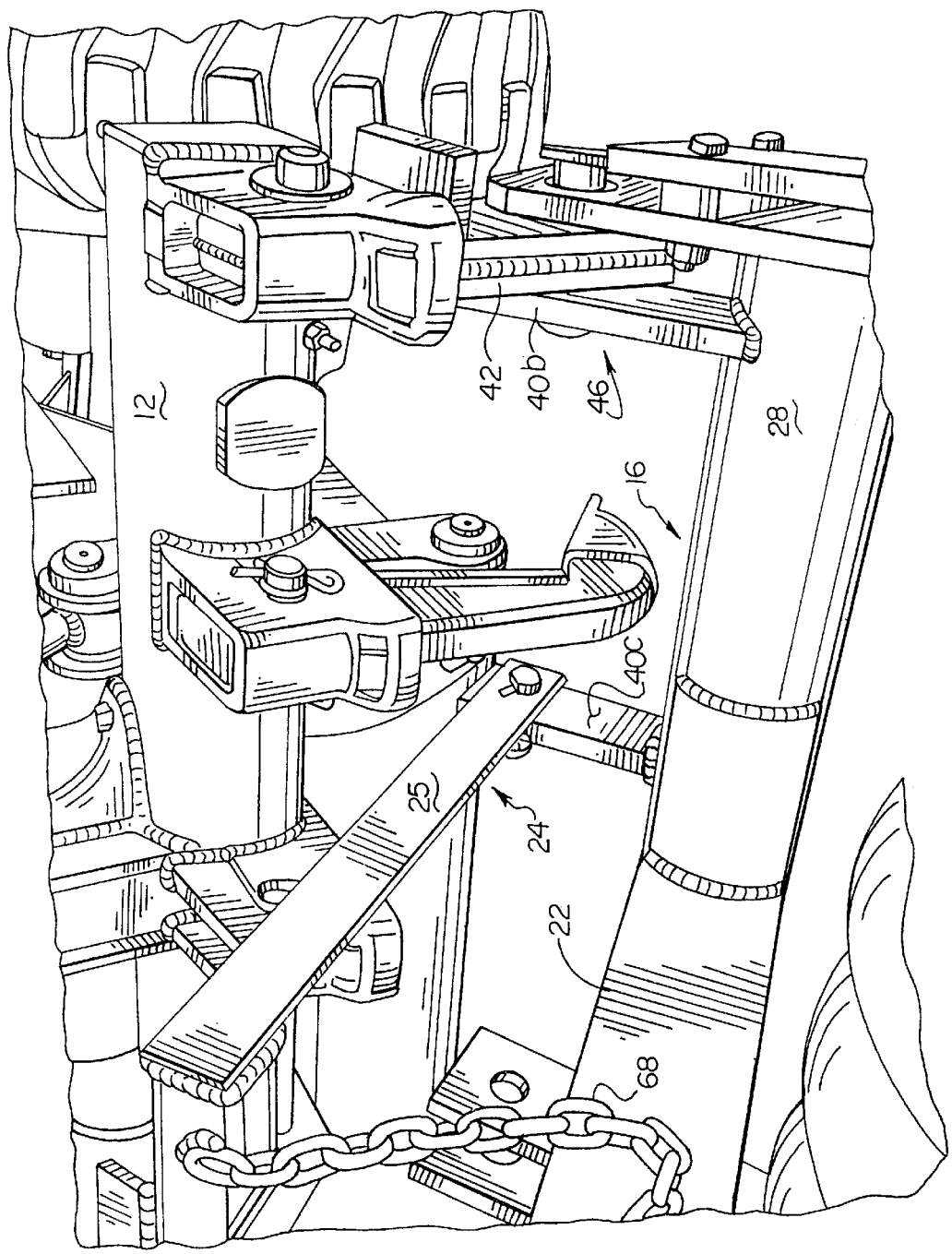
FIG. 7 is a partial rear perspective view of the ground surface treatment apparatus of the subject invention particularly illustrating a pivot frame linkage thereof with the ripping tool.

With particular reference to FIGS. 5 and 7, a plurality of spaced apart apertured tabs 40 (i.e., fastening structures) extend forward (i.e., in a direction away from the axle 32) from the main beam 28. A first or outermost pair of apertured tabs 40a are positioned (i.e., carried) at the opposing ends 29 of the main beam 28, more particularly the end surfaces thereof, with each of the opposing arms 30 shown attached thereto (i.e., bolted, see FIG. 5).

A second or intermediate pair of apertured tabs 40b are positioned near the opposing ends 29 of the main beam 28 so as to be adjacent to the first pair of apertured tabs 40a. The first 40a and second 40b pairs of apertured tabs supportingly receive a ripper shank or tooth 42 therebetween, the ripper shank 42 being adapted to receive a pivot pin or the like 44 for securing it to the frame 16 of the ground surface treatment apparatus 10, thereby defining a pivot interface 46 (i.e., a pivot frame linkage) for the ground surface treatment apparatus 10 relative to the ripping tool 12. By this association, the frame 16 is fully integrated with the ripping tool 12 so as to be "piggybacked" thereon, with great efficiencies thereby accruing.

A third or innermost pair of apertured tabs 40c are positioned on the main structural member 28 of the frame 16 to supportingly receive the arms 48 of the bracket 24 of the linkage assembly 20. As best seen in FIG. 7, and as will later be discussed with respect to the resiliently responsive linkage 20 of the apparatus 10, the bracket 24 is joined to the frame 16 so as to be pivotable, a variable angle θ being defined thereby.

Figure 6:
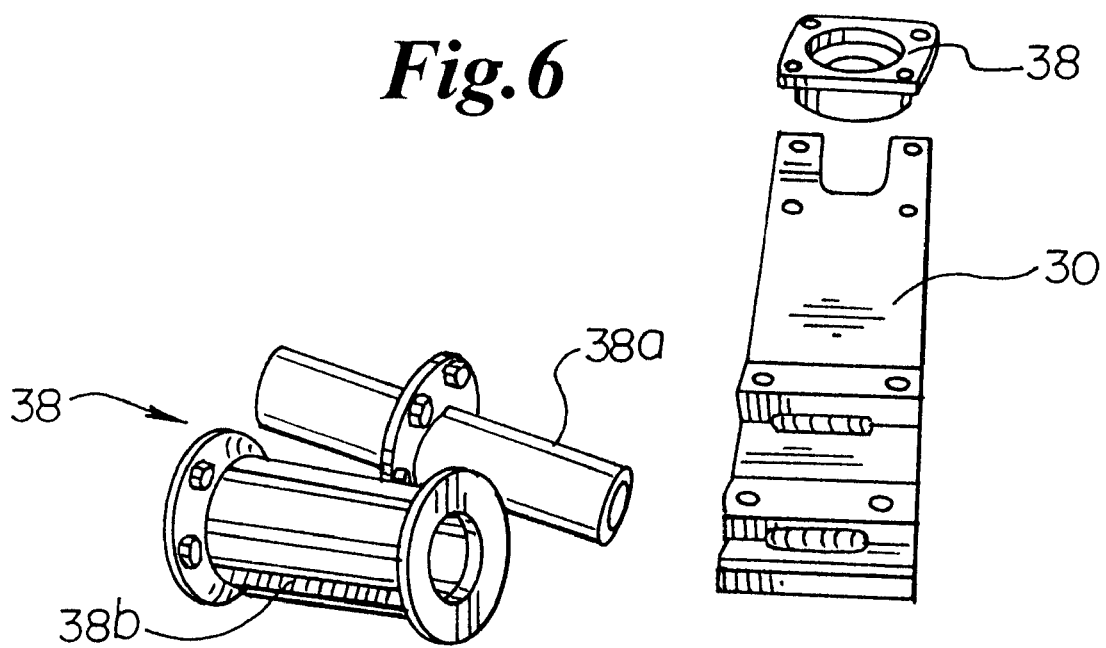
FIG. 6 is a depiction of select axle assembly components of the subject invention.

With particular reference now to FIGS. 5 and 6, the axle 32 generally traverses the opposing arms 30 of the frame 16, being operatively supported upon the arms 30 and the center bracket 34. The axle 32, which comprises a shaft 36 and mounting bearings 38, in turn operatively supports a plurality of spaced apart ground engaging rollers 50, more particularly, pneumatic tires. While the preferred ground engaging implement 18 comprises a plurality of spaced apart discrete rollers 50 on a single axle 32, it should be understood that numerous arrangements of, or configurations for, discrete rollers for treating a ground surface or the like are possible, being well within the skill of artisans in the subject area. So too are other axially supported rolling surface treatment implements contemplated, as for instance drum rollers, lobed wheels, rowed rollers, etc.

The discrete rollers 50 generally comprise a rim 52 and a tire 54 carried thereon, with rim size and tire style (e.g., pneumatic/solid, size/tread configuration, etc.) being a matter of sought after apparatus performance. The rollers 50 are axially aligned in a spaced apart condition upon the axle shaft 36 by means of spacer hubs 56. Two spacer hub configurations are generally shown in FIG. 6, in addition to the axle end bearing 38 and frame arm 30 shown.

The doubly flanged spacer hub 56a in the foreground of FIG. 6 is adapted to carry two rollers (i.e., rims), whereas the centrally flanged spacer hub 56b there behind is capable of carrying a single roller. The general arrangement of the spacer hubs 56 on the axle shaft 36 are shown in FIG. 5, namely an alternating arrangement of two, one, two for each half of the axle is shown (i.e., the single rim carrying hub 56a is interposed between two of the double rim carrying hubs 56b, which are in turn interposed between intermediate and end axle bearings 38). This arrangement for the rollers upon the axle shaft, and more generally the axle assembly construction and interface with the frame, provides for expeditious assembly and disassembly, making repairs and or maintenance less burdensome and cumbersome than heretofore know assemblies, and further contributes to the versatility of the apparatus.

Figure 3:
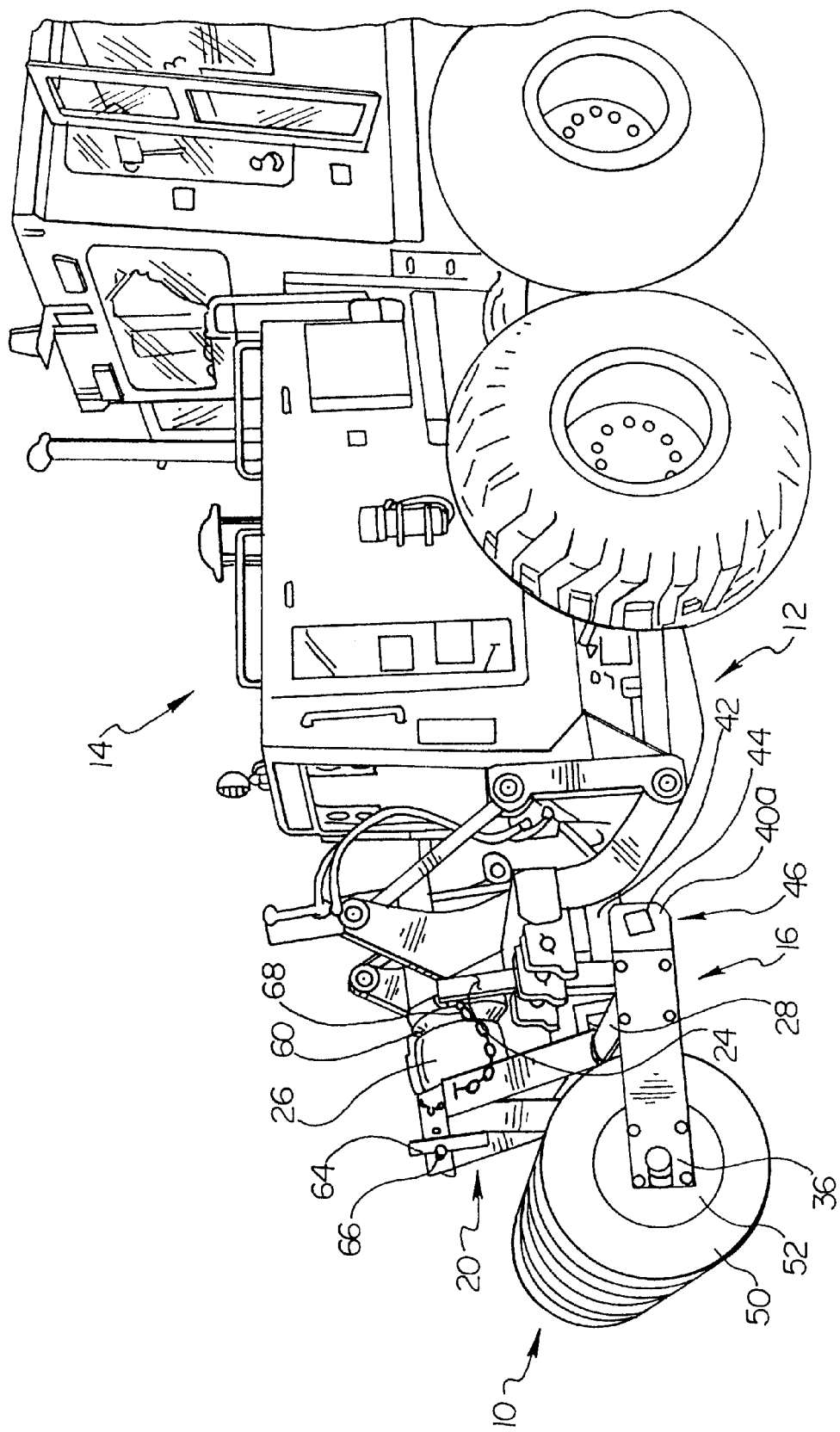
FIG. 3 is a view as FIG. 2 wherein the ground engaging rollers of the ground surface treatment apparatus are in an elevated condition above the ground surface, as during transport.
Figure 4:
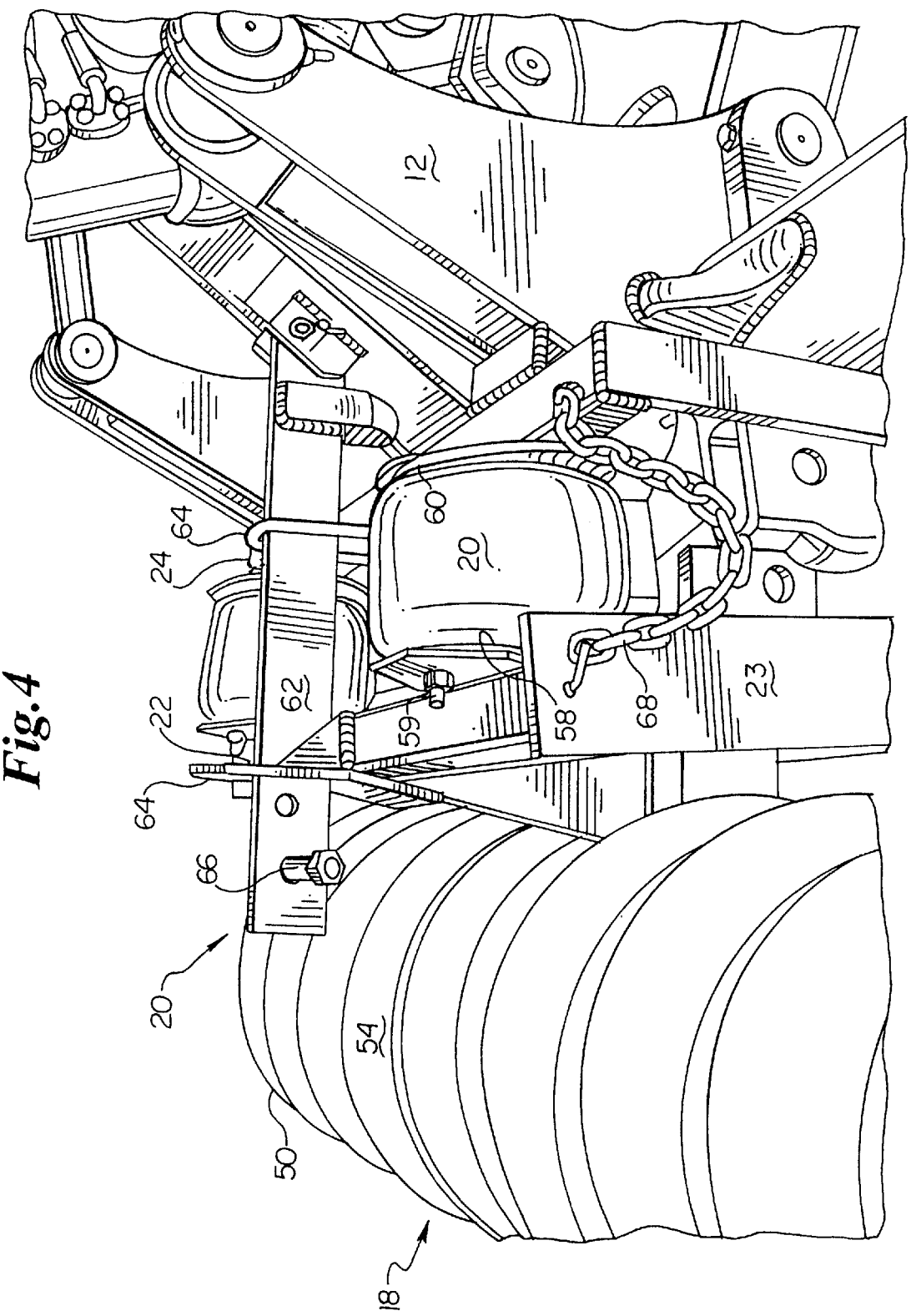
FIG. 4 is a side perspective view of the upper portion of the resiliently responsive linkage assembly, particularly illustrating the operative connection thereof with a portion of the ripping tool.
Figure 8:
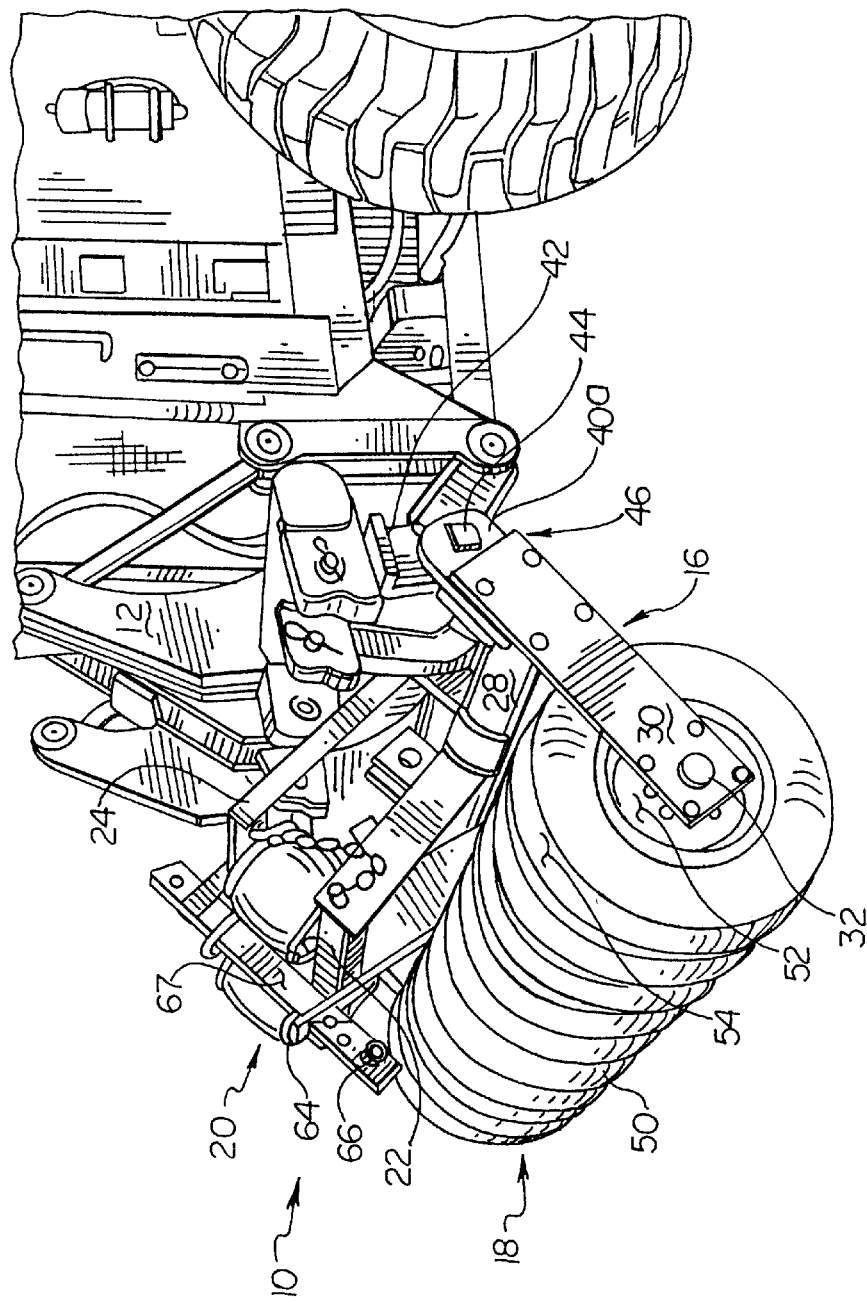
FIG. 8 is a view similar to that of FIG. 2 wherein the resiliently responsive linkage assembly is shown disengaged from the ripping tool; and, FIG. 9 is side perspective view of the upper portion of the resiliently responsive linkage assembly, particularly illustrating the assembly disengaged from the ripping tool.
Figure 9:
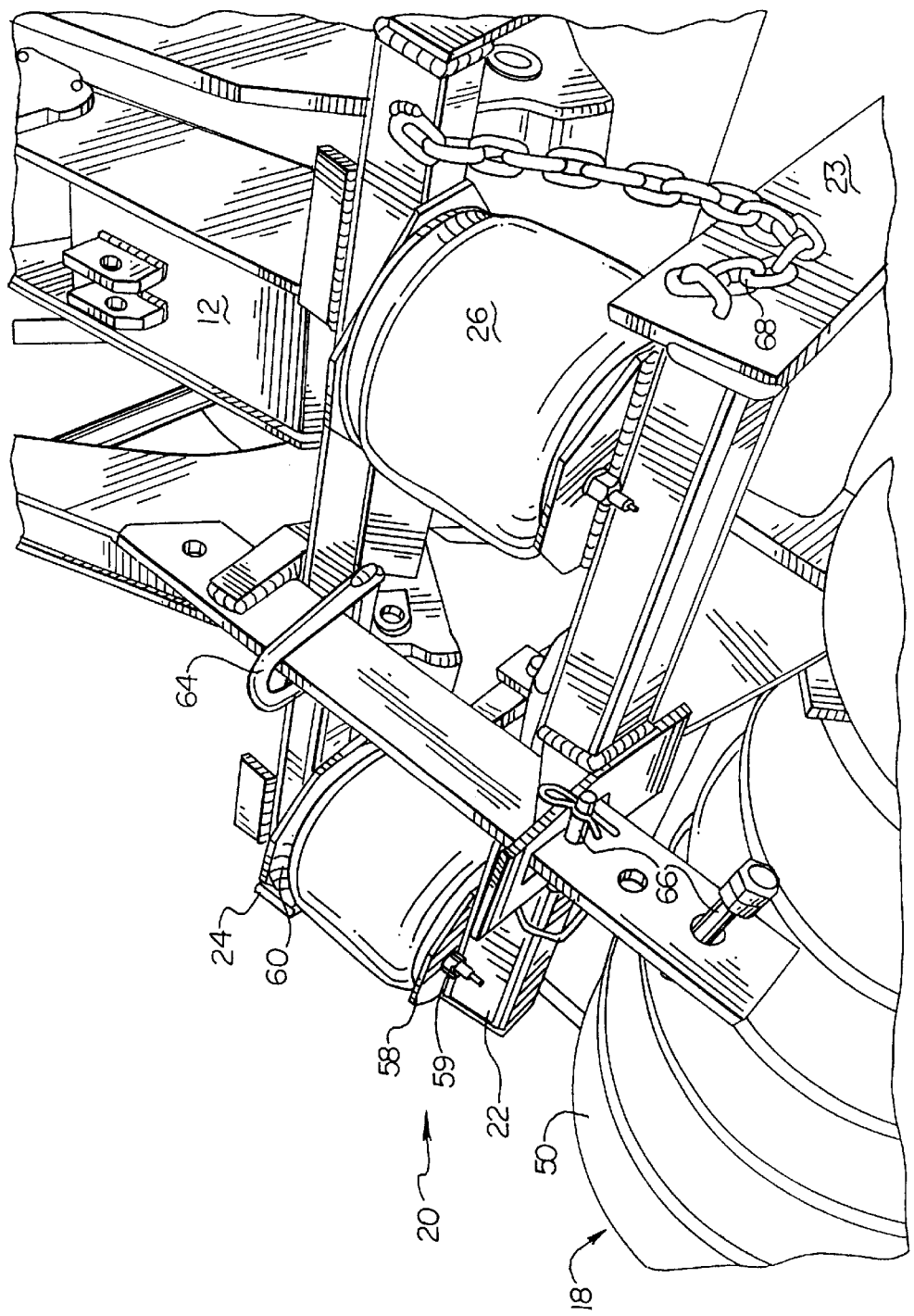

Referring now generally to FIGS. 3, 4, and 7–9, the resiliently responsive linkage assembly 20 is shown operatively engaged with a portion of the ripping tool 12 in FIGS. 3 and 4, and disengaged therefrom in FIGS. 7–9. The resiliently responsive linkage assembly 20 generally includes the bladder anchor structure 22, the bracket 24, and the resilient bladder 26 which joins the free or "closed" ends of the anchor structure 22 and the bracket 24. The linkage assembly 20 permits the efficient application of down pressure from the ripping tool 12 to the ground engaging rollers 18, via the apparatus frame 16, by providing a responsive, fluid interface between the pressure source and ground treatment implement.

As is best seen in FIG. 7, both the bladder anchor structure 22 and the bracket 24 of the resiliently responsive linkage assembly 20 each have one end attached to the main beam 28 of the frame 16. The bladder anchor structure 22 is preferably joined to the main beam 28 so as to extend therefrom, more particularly, opposing arms 23 extend from the main beam 28 and are joined together at their free ends to form a free or closed end for the bladder anchor structure. The bracket 24 is similarly configured, having opposing arms 25 joined at their free ends to form a free or closed bracket end, however, the opposing arms 25 are not directly and rigidly joined to the main beam 28 of the frame 16, instead being pivotably attached to the inner most apertured tabs 40c extending forward from the main beam 28 (FIGS. 5 and 7).

Both the anchor structure 22 and the bracket 24 have their closed ends adapted to securingly receive ends of the resilient bladder 26 such that the frame 16 is responsive to ripping tool manipulations and ground surface conditions, the frame 16 being buffered by the bladder or bladders 26. Preferably, two bladders are interposed between the closed ends of the anchor structure 22 and the bracket 24, although the number of, or configuration for, the bladders 26 is not limiting. Mounting hardware is used to indirectly secure the bladder in place, for instance, a plate 58 and accompanying fasteners 59 "anchor" one end of the bladder 26 to the bladder anchor structure 22, whereas the opposing bladder surface is indirectly attached to the bracket 24 via a bladder engaging element 60 (i.e., a displacer). It should be understood that the nature of the interface described for the opposing bladder ends may be reversed, and that other known fastening arrangements, mechanical or otherwise, are likewise contemplated, without departing from the scope of the invention.

As best seen in FIG. 4, the resiliently responsive linkage assembly 20 is operatively joined or anchored to the ripping tool 12 by a bar 62 which guides the translation of the closed ends of the anchor structure 22 and the bracket 24, whether it be in a relative sense, as when the anchor structure 22 pivots in response to bladder expansion/contraction, or in a collective sense, as shown in FIGS. 8 and 9, when the resiliently responsive linkage assembly 20 is disengaged from the ripping tool 11. Furthermore, when attached to a portion of the ripping tool 11, the bar 62 positions the bracket 24 for substantial abutting engagement therewith (FIGS. 2–4 in contrast to FIGS. 7 and 8) so as to resist expansion of the bladders 26 and thereby impart or transfer a downward force to the frame 16 of the apparatus, vis-a-vis the other components of the resiliently responsive linkage 20.

Both the anchor structure 22 and the bracket 24 are equipped at their closed ends with loops or brackets 64, within which the bar 62 is received. The bar 62 is capable of reversible attachment to a portion of the ripping tool 11 which has been adapted to receive same. Although a conventional interface or connection between the bar 62 and the ripping tool 11 is contemplated, as shown in FIGS. 4 and 9, other know means are equally suitable.

The free end of the bar 62 is adapted so as to receive one or more variably positionable limiters 66 (i.e., travel stops), such as a bolt or the like. Such adaptation prevents the dissociation of the anchor structure 22 and the bracket 24 from the operative connection (see e.g., FIG. 4 or 9). Furthermore, a response limiter 68 (e.g., a chain, cable, etc.) tethers the anchor structure 22 to the bracket 24 and thereby limits translation of the anchor structure 22, and frame 16 thereby, relative to the bracket 24 (i.e., it prevents the bladders 26 from over-extending).

While a preferred embodiment of the present invention has been described, it should be understood that various changes, adaptations and modifications may be made therein without departing from the spirit of the invention. Changes may be made in details, particularly in matters of shape, size, material, and arrangement of parts without exceeding the scope of the invention. Accordingly, the scope of the invention is as defined in the language of the appended claims.

What is claimed is:

1. A ground surface compaction apparatus comprising a frame axially supporting a plurality of compaction elements, said frame adapted to be operatively received upon select ripping elements of a plurality of ripping elements of a ground ripping attachment of a self propelled vehicle such that the ground ripping attachment need not be removed from the self propelled vehicle so as to achieve ground surface compaction.

2. The apparatus of claim 1 further comprising a resiliently responsive linkage, said resiliently responsive linkage being interposed between a portion of said frame and a portion of the ground ripping attachment such that said frame is resiliently responsive to ground ripping tool manipulations and ground surface contours.

3. The apparatus of claim 2 wherein said resiliently responsive linkage comprises means for limiting the resilient response of said frame to ground ripping tool manipulations and ground surface contours.

4. The apparatus of claim 3 wherein each compaction element of said plurality of compaction elements are rotatable upon a shaft depending from said frame.

5. The apparatus of claim 4 wherein said plurality of compaction elements are supported on said shaft in a spaced apart condition.

6. The apparatus of claim 4 wherein said plurality of compaction elements comprises pneumatic tires.

7. A ground surface compaction apparatus comprising:
   a. a frame adapted to be received within a ripping element socket of a ripping tool of a self propelled vehicle, said frame comprising a main beam joining a pair of opposing arms;
   b. an axle operatively supported between said opposing arms of said frame, said axle adapted to carry a plurality of compaction elements; and,
   c. a linkage assembly permitting the transmission of compacting force from the ripping tool to said frame, said linkage assembly interposed between said frame and a portion of the ripping tool.

8. The apparatus of claim 7 wherein said frame is pivotably connected to the ripping tool.

9. The apparatus of claim 8 wherein said linkage assembly is reversibly attached to the ripping tool.

10. The apparatus of claim 9 wherein said linkage assembly includes a resilient bladder and a bladder engaging element attached to said resilient bladder.

11. The apparatus of claim 10 wherein said linkage assembly further includes a bladder anchor structure extending from said main beam, said bladder anchor structure being adapted to securingly receive a free end of said resilient bladder.

12. The apparatus of claim 11 wherein said linkage assembly further includes a bracket pivotably mounted to said main beam such that said bracket abuts a portion of the ripping tool during ground surface treatment operations, said bladder engaging member being supported thereby.

13. The apparatus of claim 12 wherein said reversible attachment for said linkage assembly comprises a travel guide which operatively aligns said linkage assembly with the ripping tool.

14. The apparatus of claim 13 wherein said travel guide cooperatively engages said bracket and said support member so as to guide bladder responsive travel of said support member relative to said bracket.

15. The apparatus of claim 14 wherein said bracket and said support member are joined so as to limit over extension of said bladder.

16. The ground surface treatment apparatus of claim 15 wherein each of said plurality of compaction elements are spaced apart along said axle.

17. In a method of compacting a ground surface with a plurality of compaction elements, the step comprising operatively attaching a ground surface compaction implement to select ripping elements of a plurality of ripping elements of a ground ripping implement.

18. A road packing implement for operative integration with a ground ripping tool having at least a pair of sockets for reversibly securing ripping elements therein, said road packing implement comprising a frame adapted to be selectively received by the pair of sockets for reversibly securing ripping elements therein in lieu of ripping elements, said frame including a main beam and spaced apart arms extending therefrom, an axially supported compacting element depending from said spaced apart arms.

19. The implement of claim 18 further comprising a resiliently responsive linkage, said resiliently responsive linkage being interposed between a portion of said frame and a portion of the ground ripping tool such that said frame is resiliently responsive to ground surface contours.

20. The implement of claim 19 wherein said linkage assembly includes a resilient bladder and a bladder engaging element attached to said resilient bladder.

21. The implement of claim 20 wherein said linkage assembly further includes a bladder anchor structure extending from a portion of said frame, said bladder anchor structure adapted to securingly receive a free end of said resilient bladder.

22. The implement of claim 18 wherein said compacting element comprises a drum.

23. The implement of claim 18 wherein said compacting element comprises a plurality of spaced apart rollers.

24. The implement of claim 23 wherein each of said plurality of spaced apart rollers includes pneumatic tires.

* * * * *